(12) United States Patent
Xu et al.

(10) Patent No.: US 9,049,327 B2
(45) Date of Patent: Jun. 2, 2015

(54) IMAGE READING APPARATUS

(71) Applicants: Huiging Xu, Nagoya (JP); Daisuke Kozaki, Nagoya (JP); Takashi Ohama, Iwakura (JP)

(72) Inventors: Huiging Xu, Nagoya (JP); Daisuke Kozaki, Nagoya (JP); Takashi Ohama, Iwakura (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/036,916

(22) Filed: Sep. 25, 2013

(65) Prior Publication Data

US 2014/0153068 A1   Jun. 5, 2014

(30) Foreign Application Priority Data

Nov. 30, 2012   (JP) ................................. 2012-262367

(51) Int. Cl.
*H04N 1/04* (2006.01)
*H04N 1/00* (2006.01)

(52) U.S. Cl.
CPC ......... *H04N 1/00557* (2013.01); *H04N 1/0083* (2013.01)

(58) Field of Classification Search
CPC ........ B65H 37/04; B65H 43/00; B65H 45/18; H04N 2201/0081; H04N 1/02815; H04N 1/103; H04N 1/00; H04N 1/00241; H04N 1/00278; H04N 1/1013; H04N 1/1017; H04N 1/1026; H04N 1/00005; H04N 1/0053
USPC .......................... 358/482, 474, 296, 497, 1.13
See application file for complete search history.

(56) References Cited

U.S. PATENT DOCUMENTS

| | | | | |
|---|---|---|---|---|
| 5,880,852 | A * | 3/1999 | Asano et al. | 358/296 |
| 6,135,439 | A * | 10/2000 | Ikeda | 271/10.03 |
| 6,788,435 | B2 * | 9/2004 | Ouchi et al. | 358/474 |
| 7,692,825 | B2 * | 4/2010 | Koga et al. | 358/496 |
| 7,969,621 | B2 * | 6/2011 | Shunji | 358/474 |
| 8,482,814 | B2 * | 7/2013 | Hirokawa et al. | 358/474 |
| 8,547,604 | B2 * | 10/2013 | Kozaki et al. | 358/474 |
| 8,564,852 | B2 * | 10/2013 | Oshima et al. | 358/474 |
| 2003/0147105 | A1 | 8/2003 | Yamauchi | |
| 2007/0252875 | A1 * | 11/2007 | Samoto et al. | 347/85 |
| 2007/0285478 | A1 * | 12/2007 | Samoto et al. | 347/85 |
| 2008/0068679 | A1 * | 3/2008 | Murai | 358/497 |
| 2009/0128842 | A1 * | 5/2009 | Nakayama et al. | 358/1.13 |
| 2011/0211234 | A1 * | 9/2011 | Kozaki et al. | 358/474 |
| 2014/0009799 | A1 * | 1/2014 | Miura et al. | 358/474 |

FOREIGN PATENT DOCUMENTS

| | | | |
|---|---|---|---|
| JP | 2003233138 A | 8/2003 | |
| JP | 2005049613 A | 2/2005 | |

(Continued)

*Primary Examiner* — Negussie Worku
(74) *Attorney, Agent, or Firm* — Banner & Witcoff, Ltd.

(57) ABSTRACT

The instant application discloses an apparatus including an image forming unit and an image reading apparatus. The image forming unit may be disposed adjacent to the base wall of the image reading apparatus. The image reading apparatus may include a base member including the base wall and a peripheral wall protruding orthogonally from the base wall to define an accommodation region; a movable member configured to reciprocate between one end portion of the accommodation region and another end portion of the accommodation region; a reading unit supported by the movable member; a cable having a first extending portion, a curve portion, and a second extending portion; and a contact reduction portion configured to reduce contact of the second extending portion of the cable with a side wall of the peripheral wall. Various embodiments of the contact reduction portion are also disclosed.

24 Claims, 14 Drawing Sheets

(56) References Cited

FOREIGN PATENT DOCUMENTS

| JP | 3918690 | B2 | 5/2007 |
| JP | 2011030032 | A | 2/2011 |
| JP | 2012083515 | A | 4/2012 |
| JP | 2012088471 | A | 5/2012 |

\* cited by examiner

IMAGE READING APPARATUS

CROSS-REFERENCE TO RELATED APPLICATION

This application claims priority from Japanese Patent Application No. 2012-262367 filed on Nov. 30, 2012, which is incorporated by reference herein in its entirety.

FIELD OF DISCLOSURE

The disclosure herein relates to an image reading apparatus.

BACKGROUND

A known image reading apparatus includes a base member, a platen, a movable member, a reading unit, and a wiring cable.

The base member is a box shape whose upper face is open. The base member includes a bottom wall surface and a peripheral wall protruding upward from the bottom wall surface to define an accommodation area thereinside. The platen is supported by an upper end of the peripheral wall. The platen faces the bottom wall surface with a distance therebetween and covers the accommodation area. The movable member reciprocates from one end of the accommodation area to its opposite end in a scanning direction. The reading unit is supported by the movable member to face the platen in the accommodation area. The wiring cable has flexibility. A portion of the wiring cable is fixed to the bottom wall surface in the accommodation area. An end of the wiring cable is connected to the reading unit. The peripheral wall includes a side wall extending in the scanning direction.

The wiring cable includes a first extending portion, a curve portion, and a second extending portion. The first extending portion extends along the bottom wall surface from the portion of the wiring cable fixed to the bottom wall surface toward the opposite end of the accommodation area in the scanning direction. The curve portion is continued from the first extending portion. The curve portion curves to approach the platen and turns to face the base end. The second extending portion is continued from the curve portion and extends toward the base end along the platen.

In the image reading apparatus, the movable member reciprocates in the scanning direction. The reading unit moves together with the movable member and reads an image on a medium placed on the platen. At this time, the curve portion of the wiring cable reciprocates in the scanning direction in association with the reciprocating movement of the movable member. In association with the movement of the curve portion, one of the first extending portion and the second extending portion becomes longer and the other one of the first extending portion and the second extending portion becomes shorter. Thus, the wiring cable follows the reciprocating movement of the movable member and does not get in the way of image reading by the reading unit in the image reading apparatus.

In the known image reading apparatus, if the wiring cable is away from the side wall in a width direction perpendicular to the scanning direction, the size of the image reading apparatus is increased.

If the position of the wiring cable is moved closer to the side wall to reduce the size of the image reading apparatus, edges of the first extending portion, the curve portion and the second extending portion in the width direction are brought closer to the side wall. Accordingly, the first extending portion, the curve portion, and the second extending portion may readily contact the side wall. Dust (or particles) may be produced as a result of the wiring cable rubbing against the side wall. For example, particles of the side wall may be generated due to wear of the side wall over time. The dust may lead to reduction in an image reading quality as the dust moves closer to the reading unit. For example, dust may accumulate on the platen glass causing a reduction in image reading quality. In addition, as the side wall contacts the wiring cable, vibrations are caused in the wiring cable and side wall. Further, the vibrations may be transmitted to the movable member and the reading unit, leading to the reduction in an image reading quality. For example, vibrations may affect the movement of the movable member along its guide member if the guide member and/or movable member are vibrating.

SUMMARY

Aspects of the disclosure relate to an image reading apparatus that may realize a reduction in size of the image reading apparatus and/or may control the reduction of an image reading quality.

In one aspect of the disclosure, an image reading apparatus includes a base member comprising a base wall and a peripheral wall protruding orthogonally from the base wall to define an accommodation region; a movable member configured to reciprocate between one end portion of the accommodation region and another end portion of the accommodation region; a reading unit supported by the movable member, and facing a platen in the accommodation region, the reading unit configured to read an image on a medium placed on the platen while the movable member reciprocates; a cable; and a contact reduction portion configured to reduce contact of a second extending portion of the cable with a side wall of the peripheral wall. The cable may include a curve portion; a first extending portion extending along the base wall from a portion of the cable fixed to the base wall to the curve portion of the cable; and the second extending portion continuing from the curve portion and extending to an end portion of the cable connected to the movable member.

In some aspects of the disclosure, the image reading apparatus may be a part of a larger apparatus including an image forming unit configured to form an image on a medium. The image forming unit may be disposed adjacent to the base wall of the image reading apparatus. The first extending portion, the curve portion, and the second extending portion may be disposed in a wiring area, and the base wall may include a recess in the wiring area.

In some aspects of the disclosure, the contact reduction portion may extend from the side wall of the peripheral wall. For example, the contact reduction portion may include a first inclination surface that connects the base wall and the side wall, and inclines with respect to the base wall. A distance between a boundary line, where the first inclination surface meets the base wall, and the side wall in a width direction is approximately equal to a distance between an edge of the second extending portion and the side wall in the width direction. Also, the first inclination surface may include ribs disposed with a distance therebetween.

In some aspects of the disclosure, the contact reduction portion comprises an inclination surface that connects the base wall and the side wall and inclines with respect to the base wall, and is configured to contact a facing surface of the first extending portion that face the base wall. This inclination surface may include ribs disposed with a distance therebetween. The ribs may be separated in a scanning direction in which the movable member reciprocates, and may extend in a width direction that corresponds to a width of the cable and is approximately perpendicular to the scanning direction. Alternatively, the ribs may be separated in a width direction and extend in a scanning direction that is approximately perpendicular to the width direction, and a height of the ribs may decrease in the width direction.

The summary here is not an exhaustive listing of the novel features described herein, and is not limiting of the claims. Other objects, features, and advantages will be apparent to persons of ordinary skill in the art from the following detailed description of the disclosure and the accompanying drawings.

BRIEF DESCRIPTION OF THE DRAWINGS

The present disclosure is illustrated, and not limited, by way of example by the accompanying figures in which like reference numerals indicate similar elements.

DETAILED DESCRIPTION

Example embodiments are described in detail herein with reference to the accompanying drawings.

(First Embodiment)

Figure 1:
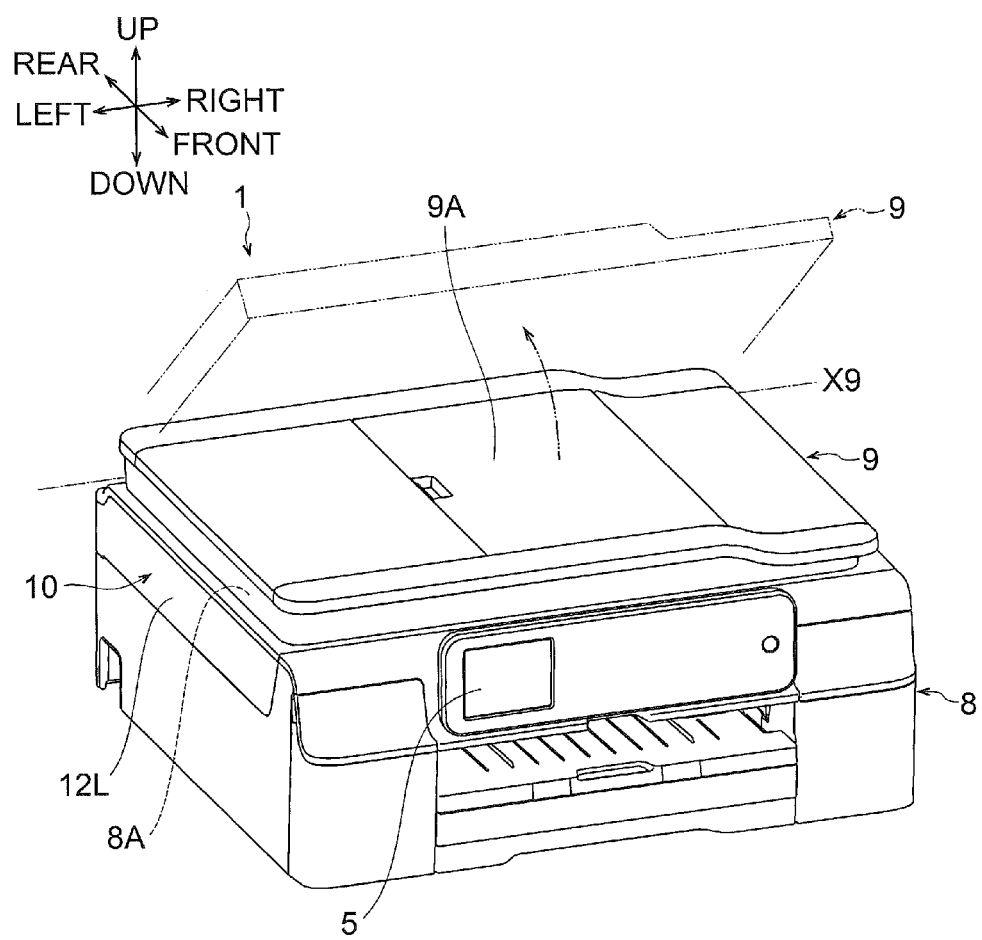
FIG. 1 is a perspective view of an example embodiment of an image reading apparatus according to one or more aspects of the disclosure.

Aspects of the disclosure may be applied to an image reading apparatus 1 as depicted in FIG. 1. In FIG. 1, a side of the image reading apparatus 1 on which a control panel 5 is disposed may be defined as a front side. Front, rear, left, right, top, and bottom sides of the image reading apparatus 1 may be defined in conjunction with an orientation in which the image reading apparatus 1 is viewed from the front side. Labeling of the front, rear, left, right, top, and bottom sides in FIGS. 2-14 may correspond to the labeling of FIG. 1.

Figure 2:
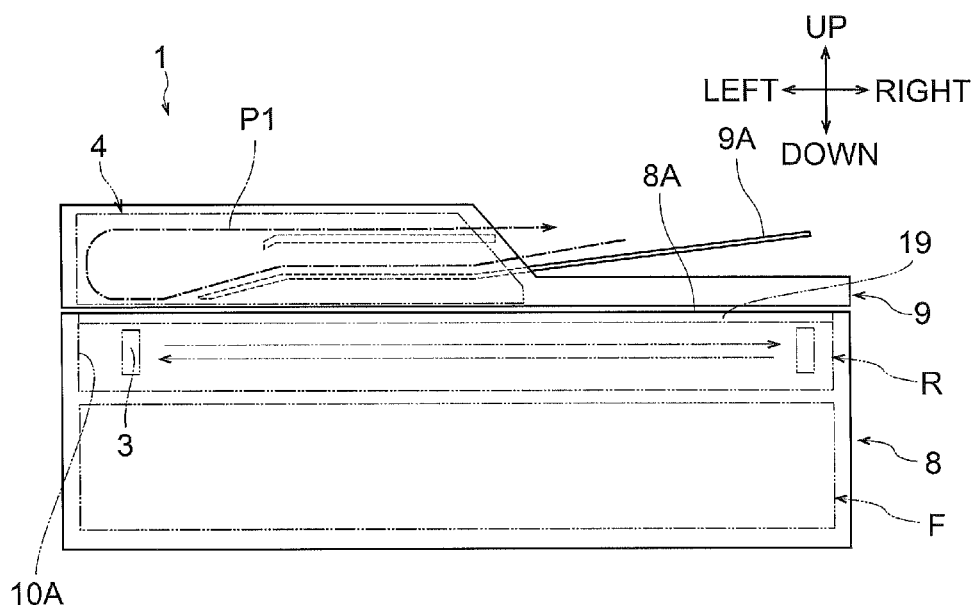
FIG. 2 is a schematic side view of an example embodiment of the image reading apparatus.

As depicted in FIGS. 1 and 2, the image reading apparatus 1 may comprise a main casing 8 and a cover 9. The main casing 8 may generally have a flat box-shape. The control panel 5 may be disposed on the front side of the main casing 8. As depicted in FIG. 2, a platen, e.g., a platen glass 19, may be disposed on an upper surface of the main casing 8. An upper surface of the platen glass 19 may be a mount surface 8A configured to support a medium, e.g., a document or a sheet member such as a sheet of paper or an overhead projector (OHP) sheet, when the medium is being read.

As depicted in FIG. 1, the cover 9 may be supported by the main casing 8 so as to pivot on hinges (not depicted) disposed at an upper rear end of the main casing 8 about an axis X9 extending along the left-right direction. The cover 9 may be configured to cover the mount surface 8A from above when the cover 9 is closed, as depicted in solid lines in FIG. 1. The cover 9 may be configured to open a portion above the mount surface 8A by pivoting about the axis X9 such that the front side of the cover 9 moves upward and rearward, as depicted in two-dot chain line in FIG. 1. Thus, a user may be able to place a document to be read on the mount surface 8A.

As depicted in FIGS. 1 and 2, a document plate 9A may be disposed at an upper side of the cover 9. The document plate 9A may be configured to open and close. As depicted in FIG. 2, an automatic document feeding mechanism 4 may be disposed in the cover 9. The automatic document feeding mechanism 4 may be known and detailed description thereof may be omitted herein. A plurality of the documents placed on the document plate 9A that is in an open state may be separated one by one and may be sequentially fed along a feeding path P1.

Figure 3:
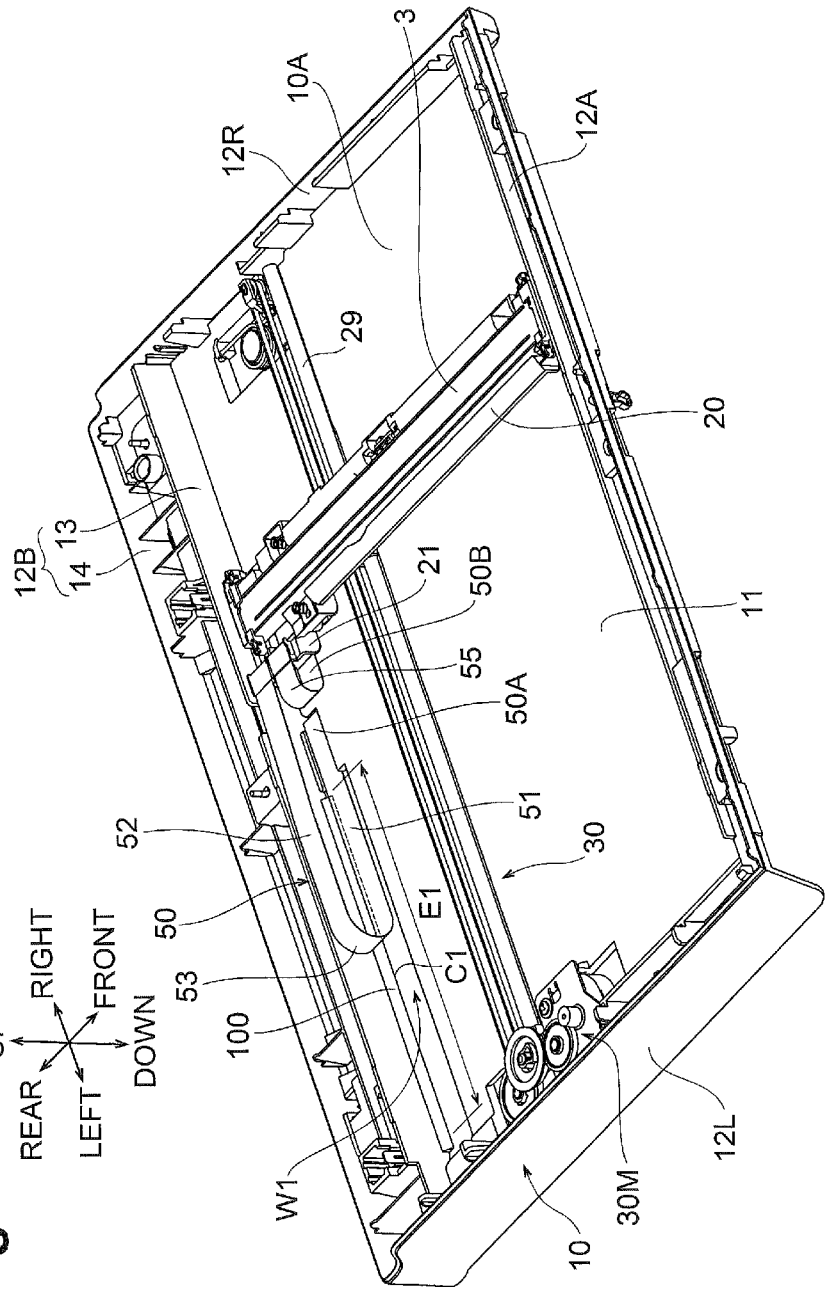
FIG. 3 is a perspective view of a base member, a carriage, a reading unit and a scanning mechanism of an example embodiment of the image reading apparatus with a platen glass of the image reading apparatus removed.
Figure 4:
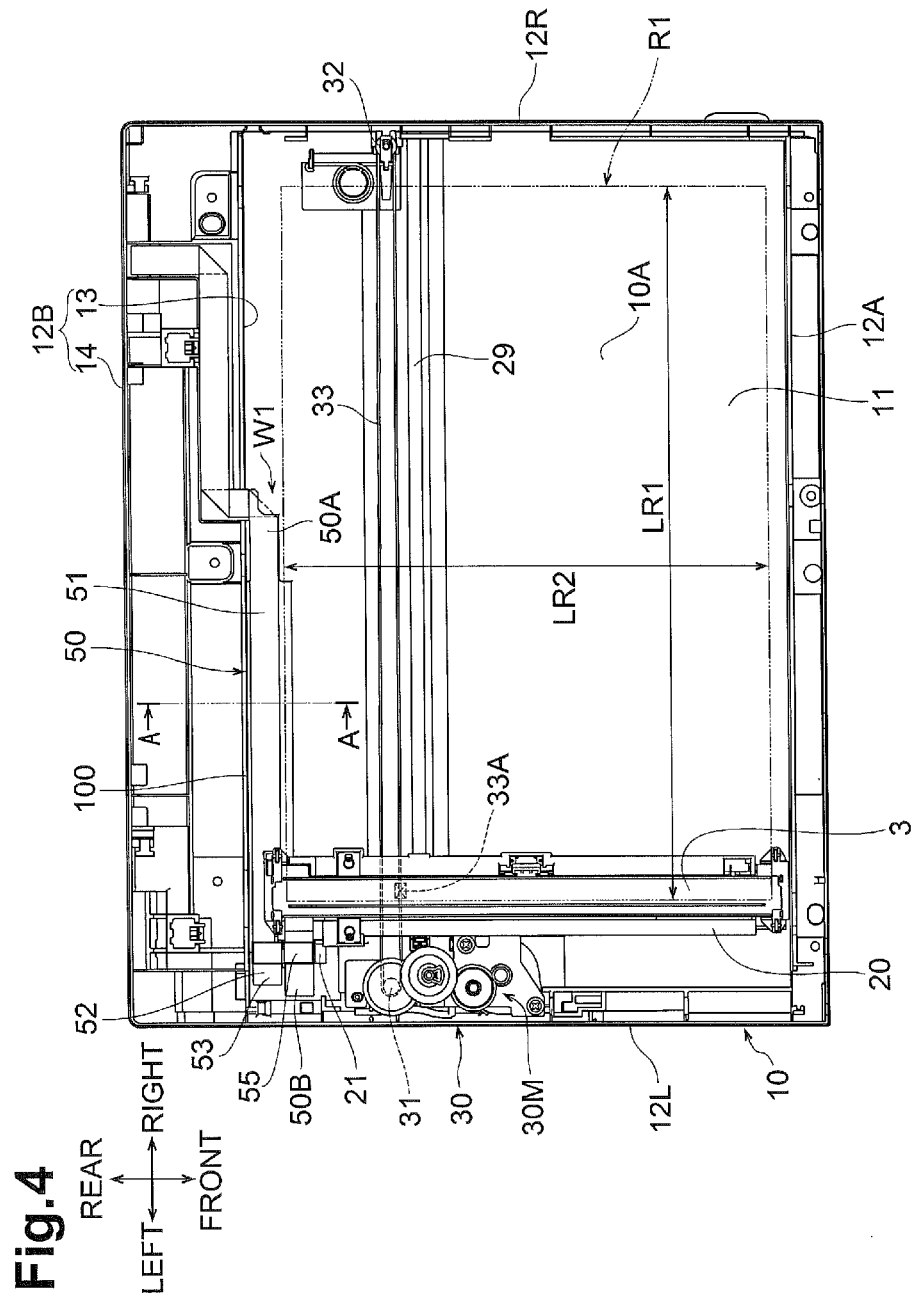
FIG. 4 is a top view of the base member, the carriage, the reading unit and the scanning mechanism of an example embodiment of the image reading apparatus with the platen glass removed.
Figure 5:
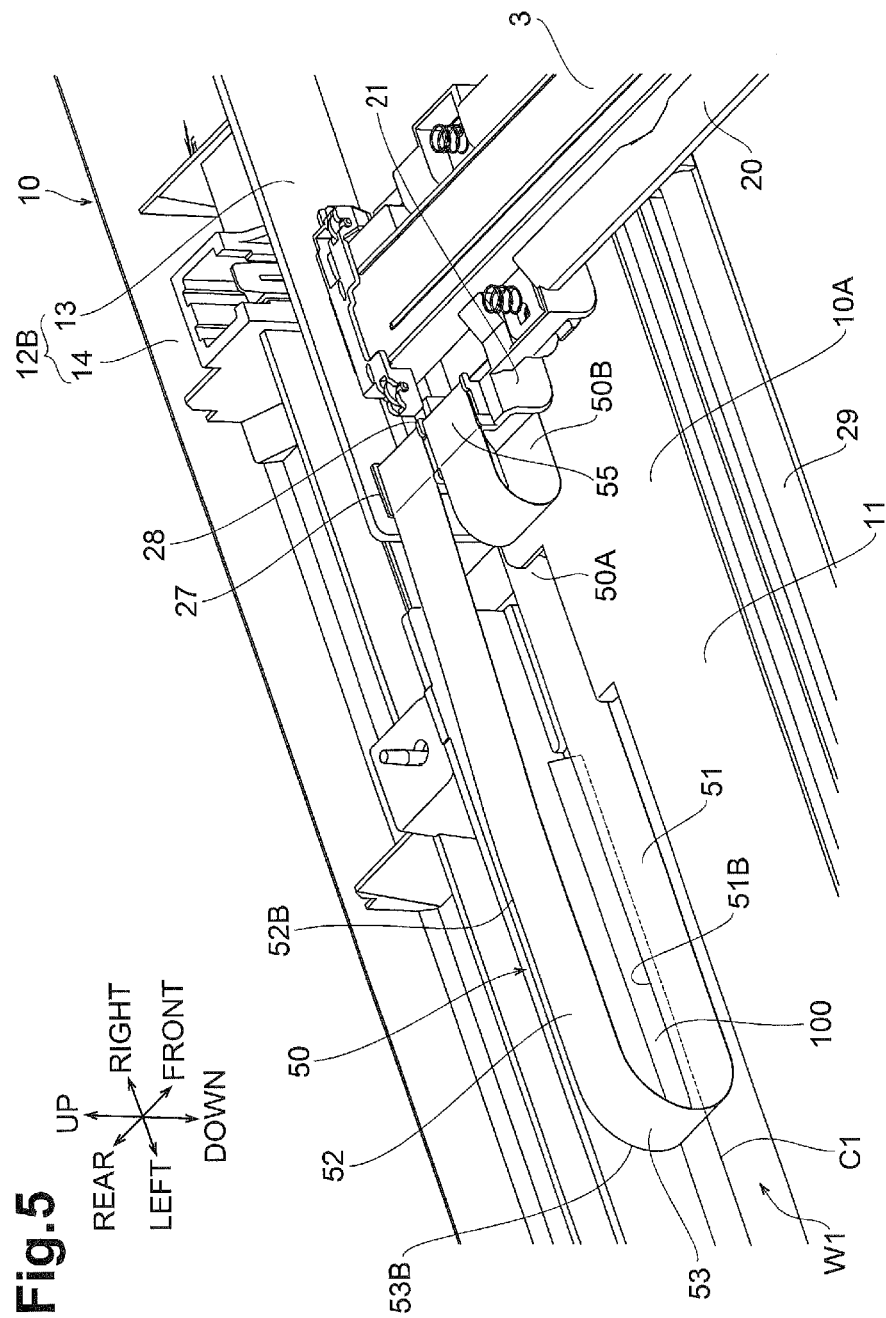
FIG. 5 is a partially enlarged perspective view of a portion of the image reading apparatus of FIG. 3.

An image forming unit F may be disposed on a lower side of the main casing 8. The image forming unit F may comprise an inkjet image forming section or a laser-beam image forming section. An image reading unit R may be disposed on an upper side of the main casing 8. The image reading unit R may comprise a base member 10 depicted in FIGS. 3-6, a frame (not depicted) attached to the base member 10 from above, and the platen glass 19 depicted in FIGS. 2 and 6. FIGS. 3-5 do not depict the platen glass 19.

As depicted in FIGS. 3-6, the base member 10 may be formed from thermoplastic resin by injection molding. The base member 10 may comprise a base wall 11 (e.g., a bottom wall surface) and peripheral walls 12A, 12B, 12L, 12R.

The bottom wall surface 11 may generally be a rectangular flat surface that may extend horizontally in a left-right, front-rear plane. The peripheral walls 12A, 12B, 12L, 12R may extend upward from front, rear, left, and right edges of the bottom wall surface 11, respectively. The rear peripheral wall 12B may comprise a side wall 13 extending in the left-right direction and an outer wall 14 extending parallel to the side wall 13 in the left-right direction behind the side wall 13. The hinges may be disposed between the side wall 13 and the outer wall 14 to pivotally support the cover 9. The front peripheral wall 12A, the side wall 13 of the rear peripheral wall 12B, the left peripheral wall 12L, and the right peripheral wall 12R surrounding the bottom wall surface 11 may define an accommodation region (or accommodation area) 10A thereinside and may prevent dust (or other particles) from entering the accommodation area. A movable member, e.g., a carriage 20, a reading unit 3, a wiring cable 50 and a scanning mechanism 30 may be accommodated in the accommodation area 10A.

Figure 6:
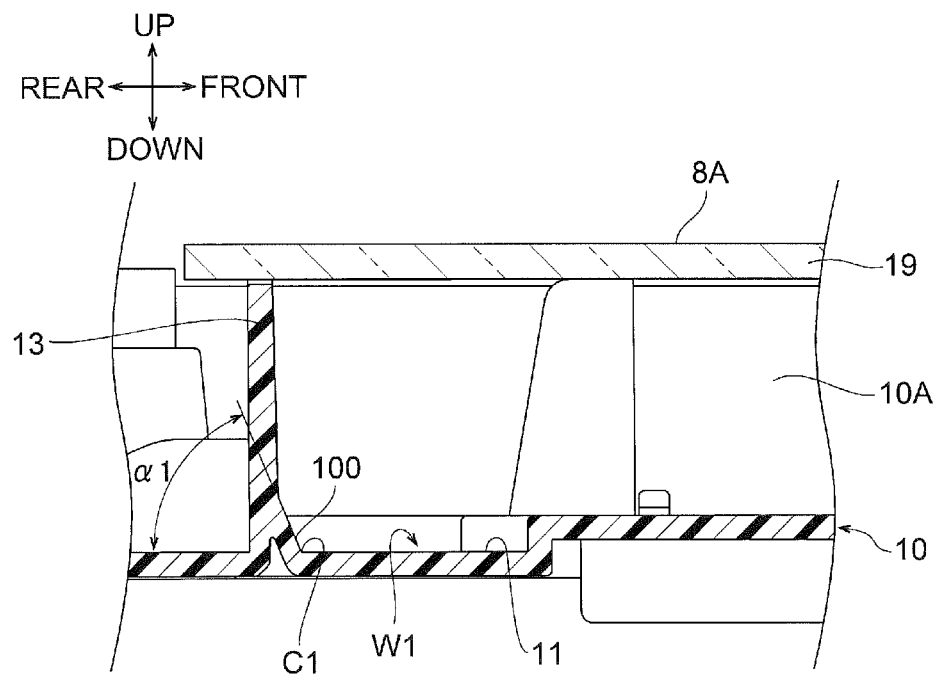
FIG. 6 is a partial sectional view of the image reading apparatus taken along a line A-A' of FIG. 4.

The platen glass 19 may be attached to the base member 10, by making the frame (not depicted) contact with peripheral ends of the platen glass 19 from above while the peripheral ends of the platen glass 19 may be supported from below by the front peripheral wall 12A, the side wall 13 of the rear peripheral wall 12B, the left peripheral wall 12L, and the right peripheral wall 12R. Thus, the platen glass 19 may be fixed to the main casing 8. As depicted in FIG. 6, the platen glass 19 may face the bottom wall surface 11 with a distance therebetween and may cover the accommodation area 10A.

As depicted in FIGS. 3 and 4, a guide shaft 29 comprising a metal rod may be disposed at the bottom wall surface 11. The guide shaft 29 may be disposed generally at a central portion of the bottom wall surface 11 in the front-rear direction. The guide shaft 29 may extend in a scanning direction, e.g., in the left-right direction. One end, e.g., a right end, of the guide shaft 29 may be fixed to a lower portion of the right peripheral wall 12R. An opposite end, e.g., a left end, of the guide shaft 29 may be fixed to a lower portion of the left peripheral wall 12L.

The carriage 20 may be formed from resin and may be elongated in the front-rear direction. The carriage 20 may extend near the front peripheral wall 12A and the side wall 13. The carriage 20 may be configured to reciprocate in the left-right direction from a portion near the left peripheral wall 12L to a portion near the right peripheral wall 12R while being guided by the guide shaft 29 above the bottom wall surface 11.

The reading unit 3 may be mounted on the carriage 20. The reading unit 3 may be supported by the carriage 20 to face the platen glass 19 in the accommodation area 10A. The reading unit 3 may comprise a known image reading sensor, e.g., a contact image sensor (CIS) or a charge coupled device (CCD). The reading unit 3 may have a length in the front-rear direction so as to exceed a width of a document (e.g., a maximum size of a document that the image reading apparatus 1 may be able to read) in the front-rear direction placed on the mount surface 8A.

As depicted in FIGS. 3-5, the wiring cable 50 may be a flexible flat cable having flexibility. The wiring cable 50 may have a plurality of cables connected in a belt shape. A fixing portion 50A of the wiring cable 50 may be fixed to the bottom wall surface 11 in the accommodation area 10A. The fixing portion 50A of the wiring cable 50 may be positioned ahead of a central portion of the side wall 13 in the left-right direction. As depicted in FIG. 4, the wiring cable 50 may extend from the fixing portion 50A to a portion between the side wall 13 and the outer wall 14, such that one end of the wiring cable 50 may electrically connect to a controller (not depicted) disposed in the main casing 8. An opposite end portion 50B of the wiring cable 50 may be fixed to the carriage 20. An end of the wiring cable 50 opposite to the one end may be electrically connected to the reading unit 3 via a connector (not depicted).

More specifically, the wiring cable 50 may comprise the fixing portion 50A, a first extending portion 51, a curve portion 53, a second extending portion 52, a folded portion 55, and the opposite end portion 50B, as depicted in FIGS. 3-6.

As depicted in FIG. 5, the first extending portion 51 may extend leftward along the bottom wall surface 11 from the fixing portion 50A of the wiring cable 50 fixed at the bottom wall surface 11. The curve portion 53 may be continued from the first extending portion 51. The curve portion 53 may semicircularly curve to approach the platen glass 19. The curve portion 53 may turn to face the right side. The second extending portion 52 may be continued from the curve portion 53 and extend rightward along the platen glass 19.

The wiring cable 50 may have flexibility, so that the curve portion 53 may curve while storing a restoring force. Upward movement of the wiring cable 50 may be restricted by the platen glass 19. The first extending portion 51 may be urged toward the bottom wall surface 11 by the restoring force of the curve portion 53. The second extending portion 52 may be urged toward the platen glass 19 by the restoring force of the curve portion 53.

Figure 8:
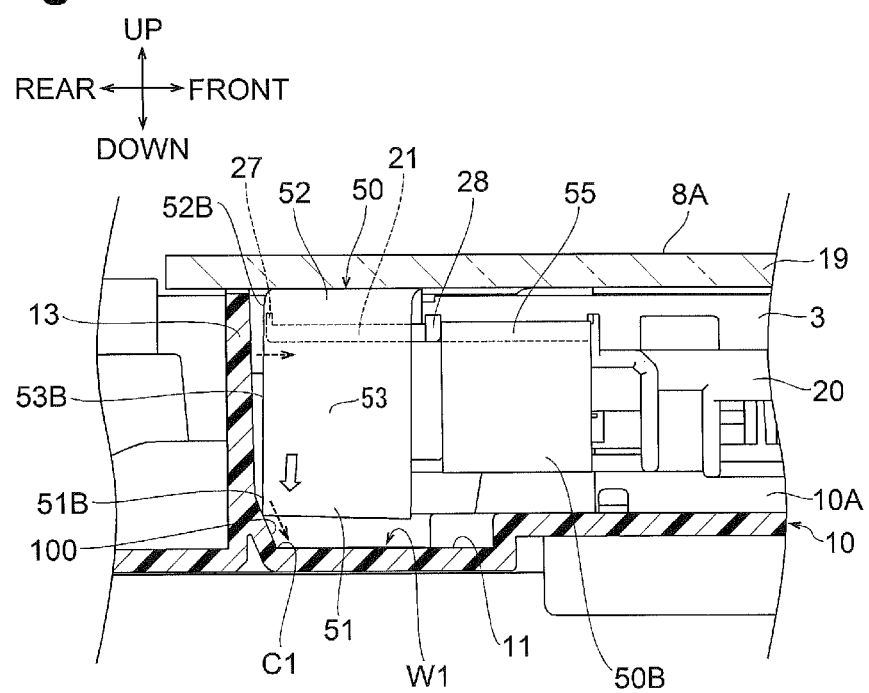
FIG. 8 is a partial sectional view of an example embodiment of the image reading apparatus, similar to FIG. 6, depicting effects of a first inclination surface of the image reading apparatus on the wiring cable.
Figure 9:
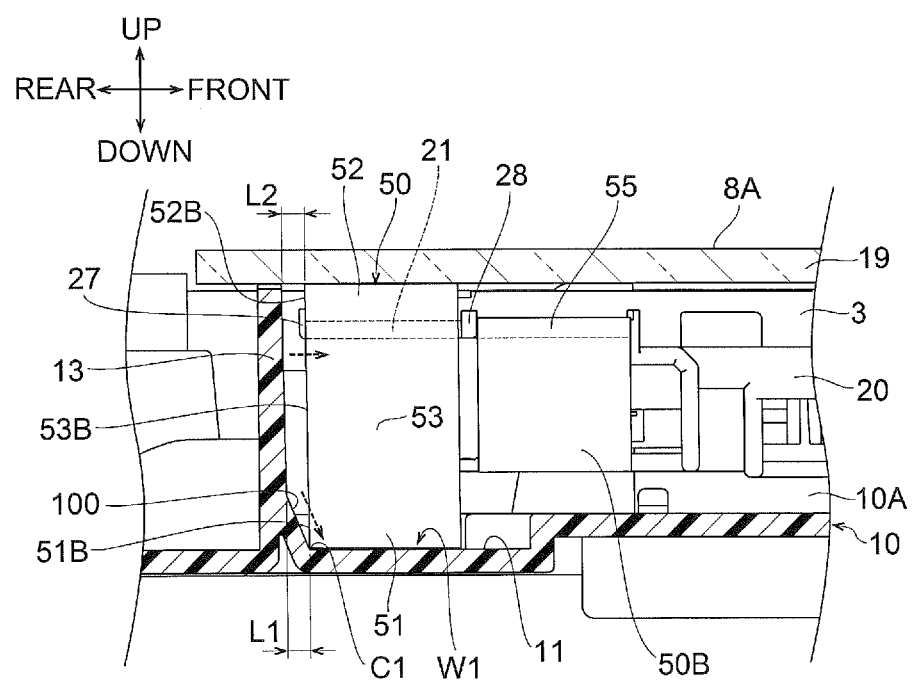
FIG. 9 is a partial sectional view of an example embodiment of the image reading apparatus, similar to FIG. 6, depicting an effect of the first sloping surface on the wiring cable.

A width direction of the wiring cable 50 may be a front-rear direction perpendicular to the left-right direction, e.g., the scanning direction. As depicted in FIGS. 5, 8 and 9, a rear edge 51B of the first extending portion 51, a rear edge 53B of the curve portion 53, and a rear edge 52B of the second extending portion 52 may be disposed along the side wall 13.

As depicted in FIG. 5, a rear end portion of the carriage 20 may be provided with a cable holding portion 21 that may extend leftward. The cable holding portion 21 may be configured to support the connection of the cable to the reading unit 3 on the carriage 20. A rear end of the cable holding portion 21 may be provided with a regulating portion 27 that may extend like a rib. The regulating portion 27 may be configured to regulate the movement of the rear edge 52B of the second extending portion 52 in the front-rear direction toward the side wall 13.

Figure 7:
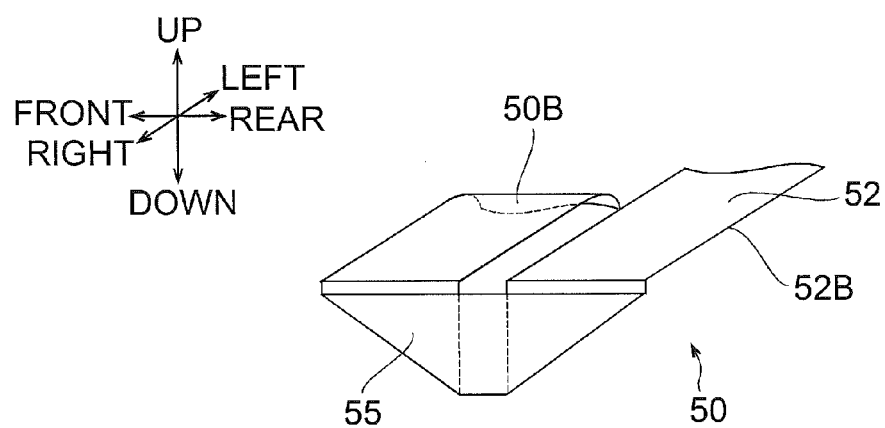
FIG. 7 is a perspective view of a second extending portion and a folded portion of a wiring cable of an example embodiment of the image reading apparatus.

As depicted in FIGS. 5 and 7, the wiring cable 50 may be folded near the right end of the second extending portion 52 toward a side opposite to the side wall 13, e.g., toward the front side to produce the folded portion 55. The wiring cable 50 may be folded multiple times to produce the folded portion 55. The folded portion 55 may comprise portions that may be disposed adjacent to each other in the front-rear direction. Folded portion 55 may connect the second extending portion 52, which is relatively close to the side wall 13, to the reading unit 3, which is relatively further from the side wall 13.

The opposite end portion 50B may curve so as to pass below the cable holding portion 21 and may extend to the opposite end of the wiring cable 50.

As depicted in FIG. 5, a spacer 28 may be disposed in front of the regulating portion 27 in the cable holding portion 21. The spacer 28 may extend upward like a rib. The spacer 28 may be positioned between the portions of the folded portion 55 disposed adjacent to each other in the front-rear direction, so as to separate the portions, e.g., to maintain distance between the portions of the folded portion 55 in the front-rear direction.

The thus structured wiring cable 50 may electrically connect the reading unit 3 mounted on the carriage 20 and the controller (not depicted).

As depicted in FIGS. 3 and 4, the scanning mechanism 30 may comprise a drive source 30M, a drive pulley 31, a driven pulley 32 and a timing belt 33 disposed in the base member 10.

The drive source 30M may comprise an electric motor, and a group of gears engaged with the electric motor. The drive source 30M may be positioned adjacent to the left peripheral wall 12L and adjacent of a left end of the guide shaft 29. The drive source 30M may be configured to rotate under the control of the controller (not depicted).

As indicated by dashed lines in FIG. 4, the drive pulley 31 may be integrally formed with the gear furthest from the electric motor among a group of the gears of the drive source 30M. The drive pulley 31 may be positioned adjacent to the left peripheral wall 12L and behind the left end of the guide shaft 29. The drive pulley 31 may be configured to rotate about an axis extending in the top-bottom direction.

As the electric motor of the drive source 30M rotates under the control of the controller (not depicted), the drive pulley 31 may be driven and rotated. As the controller changes the rotation direction of the electric motor, the drive pulley 31 may rotate in a forward direction or in a reverse direction. The rotation of the drive pulley 31 in the counterclockwise direction in FIG. 4 may be defined as the rotation in the forward direction herein. The rotation of the drive pulley 31 in the clockwise direction in FIG. 4 may be defined as the rotation in the reverse direction herein.

As depicted in FIGS. 3 and 4, the driven pulley 32 may be positioned adjacent to the right peripheral wall 12R and behind the right end of the guide shaft 29. The driven pulley 32 may be configured to rotate about an axis extending in the top-bottom direction.

The timing belt 33 may be an endless belt wound around the drive pulley 31 and the driven pulley 32. As depicted in FIG. 4, a portion of the timing belt 33 extending in the left-right direction along the guide shaft 29 may be connected to the carriage 20 by a connecting portion 33A.

When the drive pulley 31 rotates in the forward direction, the connecting portion 33A of the timing belt 33 may move from the left side to the right side, and the carriage 20 may also move from the left side to the right side. When the drive pulley 31 rotates in the reverse direction, the connecting portion 33A may move from the right side to the left side, and the carriage 20 may also move from the right side to the left side. Thus, the carriage 20 and the reading unit 3 mounted on the carriage 20 may reciprocate in the left-right direction in the accommodation area 10A in accordance with the rotation of the drive pulley 31 in the forward direction and the reverse direction. FIG. 4 may depict a reading area R1 in which the reading unit 3 may read an image. The reading area R1 may be defined as the area that can be covered by reading elements (not depicted), which are arranged on the reading unit 3, and move together with the carriage. A length LR1 of the reading area R1 in the left-right direction may correspond to the distance that the reading elements may cover when the carriage 20 moves in the left-right direction. A length LR2 of the reading area R1 in the front-rear direction may differ, according to the structure of the reading elements of the reading unit 3 and its reading method. The length LR2 may be longer or shorter than the length LR2 depicted in FIG. 4. In FIG. 4, the length LR2 may correspond to a length of an array of the reading elements arranged in the front-rear direction. When portions of the reading elements disposed on one end and its opposite end in the front-rear direction are not used for image reading, the reading area may be determined based on the length of the array of the reading elements excluding the portions of the reading element. An area located between the side wall 13 and the reading area R1 may be a wiring area W1. As depicted in FIGS. 3 and 5, the bottom wall surface 11 may be shallowly recessed in a left portion of the wiring area W1. The shallow recess in the wiring area W1 may provide additional space for the wiring cable 50, while the bottom wall surface 11 may remain higher in the reading area R1 to provide space beneath the reading area R1 for other components (e.g., the image forming unit in FIG. 2). The first extending portion 51, the second extending portion 52 and the curve portion 53 of the wiring cable 50 may be disposed in the wiring area W1.

The reading area R1 and the wiring area W1 may be separated from each other. Therefore, even when a portion of the platen glass 19 in the wiring area W1 is dirty or scratched by the second extending portion 52 of the wiring cable 50 urged toward the platen glass 19 by the restoring force of the curve portion 53, dust or scratches on the platen glass 19 might not affect an image reading by the reading unit 3 in the reading area R1.

When the carriage 20 moves from the left side to the right side, the second extending portion 52 of the wiring cable 50 may be pulled by the carriage 20, so that the curve portion 53 may move rightward. Accordingly, the first extending portion 51 may become shorter and the second extending portion 52 may become longer. When the carriage 20 moves from the right side to the left side, the second extending portion 52 of the wiring cable 50 may be pushed by the carriage 20, so that the curve portion 53 may move leftward. Accordingly, the first extending portion 51 may become longer and the second extending portion 52 may become shorter. FIG. 3 may depict a range E1 in which the curve portion 53 may move in the left-right direction. Thus, the wiring cable 50 may follow the reciprocating movement of the carriage 20 and might not get in the way of image reading by the reading unit 3.

When the image reading apparatus 1 reads a document placed on the mount surface 8A, the scanning mechanism 30 may be operated to move the reading unit 3 mounted on the carriage 20 to the right end from the left end in the main casing 8, as depicted in FIG. 2. Thus, the reading unit 3 may read an image on the document placed on the mount surface 8A. Thereafter, the scanning mechanism 30 may move the reading unit 3 that may finish image reading from the right end to the left end in the main casing 8, to return the reading unit 3 to its original (or standby) position.

When the image reading apparatus 1 reads images on a plurality of the documents placed on the document plate 9A, the scanning mechanism 30 may be operated to move the reading unit 3 mounted on the carriage 20 to a fixed position on the left end of the main casing 8, as depicted in FIGS. 2 and 4. As the automatic document feeding mechanism 4 sequentially feeds the documents placed on the document plate 9A along the feeding path P1, each document may pass over the reading unit 3 placed in the fixed position. While the document passes over the reading unit 3, the reading unit 3 may read an image on the document.

Thus, the image reading apparatus 1 may read an image on the document placed on the mount surface 8A or the document plate 9A.

<First Inclination Surface As Contact Reduction Portion>

To realize the reduction of the size of the image reading apparatus 1, the wiring area W1 disposed between the side wall 13 and the reading area R1 may be made relatively narrow in the front-rear direction. The first extending portion 51, the second extending portion 52 and the curve portion 53 of the wiring cable 50 may be disposed in the narrow wiring area W. As depicted in FIGS. 3, 6, 8 and 9, the image reading apparatus 1 may comprise a contact reduction portion, e.g., a first inclination surface 100, between the bottom wall surface 11 and the side wall 13, to prevent or reduce the contact of the second extending portion 52 and the curve portion 53 of the wiring cable 50 to the side wall 13.

The first inclination surface 100 may incline with respect to the bottom wall surface 11 that may extend in an approximately horizontal direction, and the side wall 13 that may extend in an approximately vertical direction. As depicted in FIG. 6, a boundary line C1 between the first inclination surface 100 and the bottom wall surface 11 may extend in the left-right direction at a position away from the side wall 13 toward the front side. The first inclination surface 100 may slantingly extend upward toward the rear side from the boundary line C1, and may be connected to the side wall 13.

As depicted in FIG. 3, the first inclination surface 100 may be a flat surface extending along the entire length of the range E1 in which the curve portion 53 may move in the left-right direction.

As depicted in FIG. 9, the distance between the boundary line C1 and the side wall 13 in the front-rear direction may be defined as a distance L1. The distance between the right end of the second extending portion 52 that may be connected to the carriage 20, and the side wall 13 in the front-rear direction, more specifically, the distance between the rear edge 52B of the second extending portion 52 regulated by the regulating portion 27 and the side wall 13 in the front-rear direction may be defined as a distance L2. The distance L1 may be approximately the same as the distance L2.

FIG. 9 may depict a state in which the first extending portion 51, the curve portion 53 and the second extending portion 52 are not shifted in the front-rear direction. When the first extending portion 51, the curve portion 53 and the second extending portion 52 are shifted toward the rear side so as to approach the side wall 13, as depicted in FIG. 8, the rear edge 51B of the first extending portion 51 extending along the side wall 13 may contact the first inclination surface 100. The rear edge 51B may approach the bottom wall surface 11 while sliding along the first sloping surface 100.

As depicted in FIG. 6, an inclination angle α1 of the first inclination surface 100 with respect to the bottom wall surface 11 may be preferably at least 5 degrees or more, and more preferably between 45 and 90 degrees. In the example embodiment, the inclination angle a1 may be approximately 60 degrees.

The image reading apparatus 1 according to the first embodiment may comprise the contact reduction portion, e.g., the first inclination surface 100. Therefore, the wiring cable 50 may be brought closer to the side wall 13 as depicted in FIG. 5. Thus, a reduction in size of the image reading apparatus 1 may be realized. In the image reading apparatus 1 having the first inclination surface 100, the wiring area W1 sandwiched between the side wall 13 and the reading area R1 may be made relatively narrow in the front-rear direction. The first extending portion 51, the second extending portion 52 and the curve portion 53 of the wiring cable 50 may be disposed in the narrow wiring area W1. Thus, the reduction in the size of the image reading apparatus 1 may be realized.

In the image reading apparatus 1, when the first extending portion 51, the curve portion 53 and the second extending portion 52 are shifted toward the rear side, as depicted in FIG. 8, while the curve portion 53 is moving in the left-right direction in association with the reciprocating movement of the carriage 20, the rear edge 51B of the first extending portion 51 extending along the side wall 13 may contact the contact reduction portion, e.g., the first inclination surface 100, that may be provided between the bottom wall surface 11 and the side wall 13. In the image reading apparatus 1, the first extending portion 51, the second extending portion 52 and the curve portion 53 of the wiring cable 50 may be disposed in the narrow wiring area W1, so that the distance between the side wall 13, and the first extending portion 51, the second extending portion 52 and the curve portion 53, in the front-rear direction may be short. As the rear edge 51B of the first extending portion contacts the first inclination surface 100, the first extending portion 51, the second extending portion 52 and the curve portion 53 may be inclined by a relatively small amount. Moreover, as a result of the contact, the curve portion 53 may try to move upward. However, the movement of the curve portion 53 may be regulated by the platen glass 19. The first extending portion 51 may be urged toward the bottom wall surface 11 due to the restoring force of the curve portion 53. Accordingly, the first extending portion 51 may slide along the first inclination surface 100 with the rear edge 51B contacting the first inclination surface 100. At this time, the first extending portion 51 may slide away from the side wall 13 to approach the bottom wall surface 11, as depicted in FIG. 9, because the first inclination surface 100 may be inclined downward toward the bottom wall surface 11. Therefore, the curve portion 53 and the second extending portion 52 may also move away from the side wall 13 in association with the slide of the first extending portion 51.

In the image reading apparatus 1, contact of the rear edge 53B of the curve portion 53 and the edge 52B of the second extending portion 52 to the side wall 13 may be reliably reduced or prevented by the first inclination surface 100. Consequently, in the image reading apparatus 1, amount of dust due to wear of the side wall 13 may be reduced or prevented, so that a problem with dust that may move adjacent to the reading unit 3, might not occur or might occur less frequently. In the image reading apparatus 1, vibrations of the second extending portion 52 may be reduced or prevented, so that a problem with vibrations that may be transmitted to the carriage 20 and the reading unit 3 might not occur or might occur less frequently.

Therefore, in the image reading apparatus 1 according to the first embodiment, the reduction of the size of the image reading apparatus 1 may be realized and the reduction in an image reading quality may be controlled.

In the image reading apparatus 1, the distance L1 between the side wall 13 and the boundary line C1 between the first inclination surface 100 and the bottom wall surface 11 in the front-rear direction may be approximately the same as the distance L2 between the right end of the second extending portion 52 that may be connected to the carriage 20 and the side wall 13 in the front-rear direction (more specifically, distance between the rear edge 52B of the second extending portion 52 regulated by the regulating portion 27 and the side wall 13 in the front-rear direction). Thus, in the image reading apparatus 1, after the first extending portion 51 slides so as to approach the bottom wall surface 11 along the first inclination surface 100 away from the side wall 13, as depicted in FIG. 9, the first extending portion 51 and the second extending portion 52 may readily face each other in the top-bottom direction. Thus, such a force to twist the wiring cable 50 might not be applied, and the position of the wiring cable 50 may be stabilized.

Further, in the image reading apparatus 1, contact between the right end of the second extending portion 52 closer to the carriage 20 and the side wall 13 may be reduced or prevented by the regulating portion 27 provided in the carriage 20, as depicted in FIGS. 5 and 9. Therefore, occurrence of dust due to wear of the side wall 13 may further be reduced or prevented. Vibrations of the second extending portion 52 may further be reduced or prevented.

In the image reading apparatus 1, the first inclination surface 100 may extend along the entire length of the range E1 in which the curve portion 53 may move in the left-right direction. Thus, in the image reading apparatus 1, the rear edge 51B, extending along the side wall 13, of the first extending portion 51 whose length may change in association of the movement of the curve portion 53 in the left-right direction, may reliably contact the first inclination surface 100. Therefore, contact of the rear edge 53B of the curve portion 53 and/or the rear edge 52B of the second extending portion 52 to the side wall 13 may be reliably reduced or prevented.

Further, in the image reading apparatus 1, the wiring cable 50 may comprise the folded portion 55. Accordingly, a degree of flexibility in connection of the wiring cable 50 to the carriage 20 may increase. The spacer 28 provided in the carriage 20 may be positioned between portions of the folded portion 55 disposed adjacent to each other in the front-rear direction, so as to maintain a distance therebetween in the front-rear direction. Thus, the contact between the portions of the folded portion 55 and contact between a portion of the folded portion 55 and the second extending portion 52 may be reduced or prevented.

(Second Embodiment)

Figure 10:
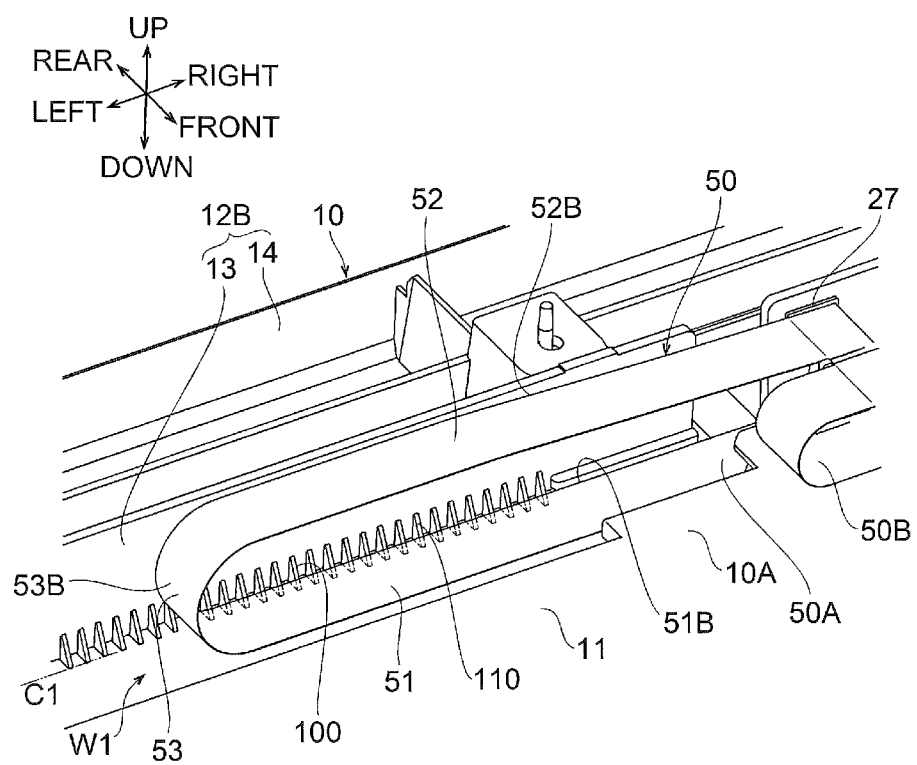
FIG. 10 is a partially enlarged perspective view of an image reading apparatus, similar to FIG. 5, according to a second example embodiment.

An image reading apparatus 1 according to a second embodiment may comprise ribs 110, as depicted in FIG. 10, instead of the first inclination surface 100 in the first embodiment. The ribs 110 may be disposed between the bottom wall surface 11 and the side wall 13 with a distance (e.g., 2 mm-3 mm) therebetween in the left-right direction. Each rib 110 may extend in the front-rear direction and have a triangular shape. An oblique side of each rib 110 may define the first inclination surface 100. Other structures in the second embodiment may be similar to those of the first embodiment. Therefore, like reference numerals may be used for like corresponding parts in FIG. 10 and a detailed description of similar parts with respect to the second embodiment might not be repeated.

In the image reading apparatus 1 according to the second embodiment, the reduction of the size of the image reading apparatus 1 may be realized and the reduction in an image reading quality may be controlled, similar to the image reading apparatus 1 according to the first embodiment.

In the image reading apparatus 1, the first inclination surface 100 may be defined by the ribs 110. Because there are gaps between the ribs 110, a contact surface between the first extending portion 51 and the first inclination surface 100 may be reduced. Meanwhile, the rear edge 51B of the first extending portion 51 may readily slide along the first inclination surface 100 toward the bottom wall surface 11 and may be placed in a more preferable position where the first extending portion 51 is further away from the side wall as shown in FIG. 9.

(Third Embodiment)

Figure 11:
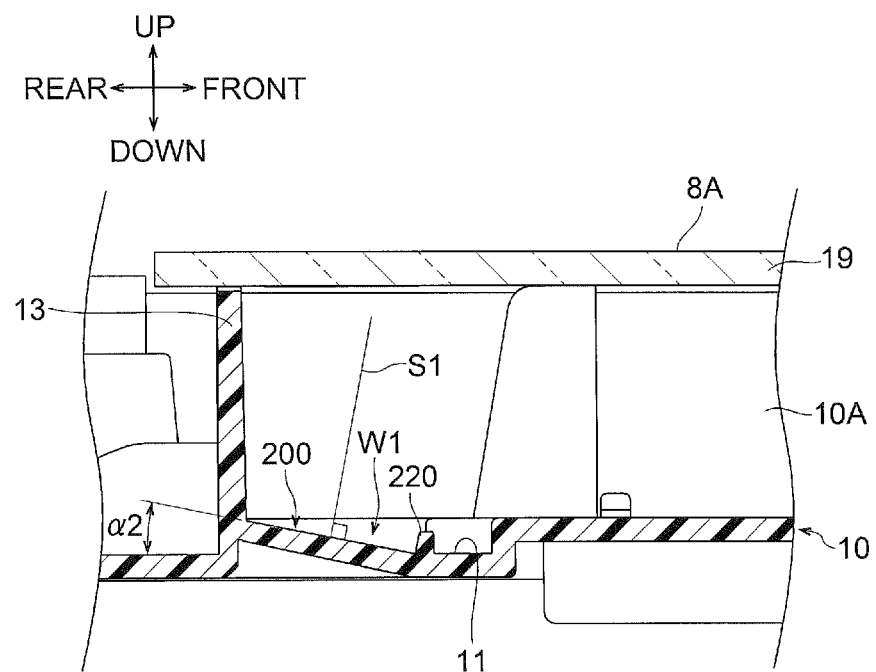
FIG. 11 is a partial sectional view of an image reading apparatus, similar to FIG. 6, according to a third example embodiment.
Figure 12:
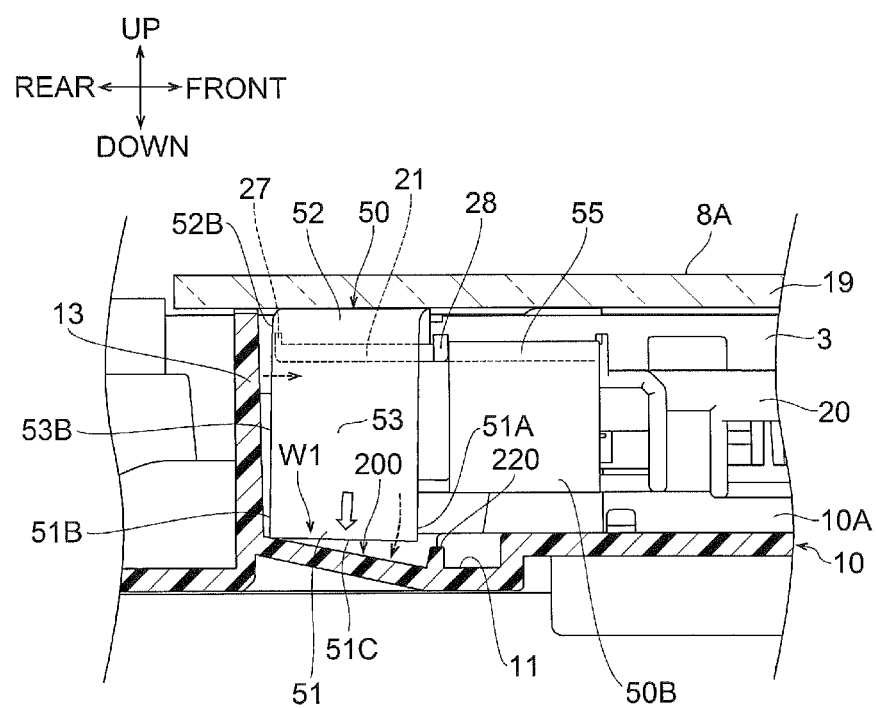
FIG. 12 is a partial sectional view of the image reading apparatus, similar to FIG. 11, according to the third example embodiment, depicting an effect of a second inclination surface of the image reading apparatus on the wiring cable.
Figure 13:
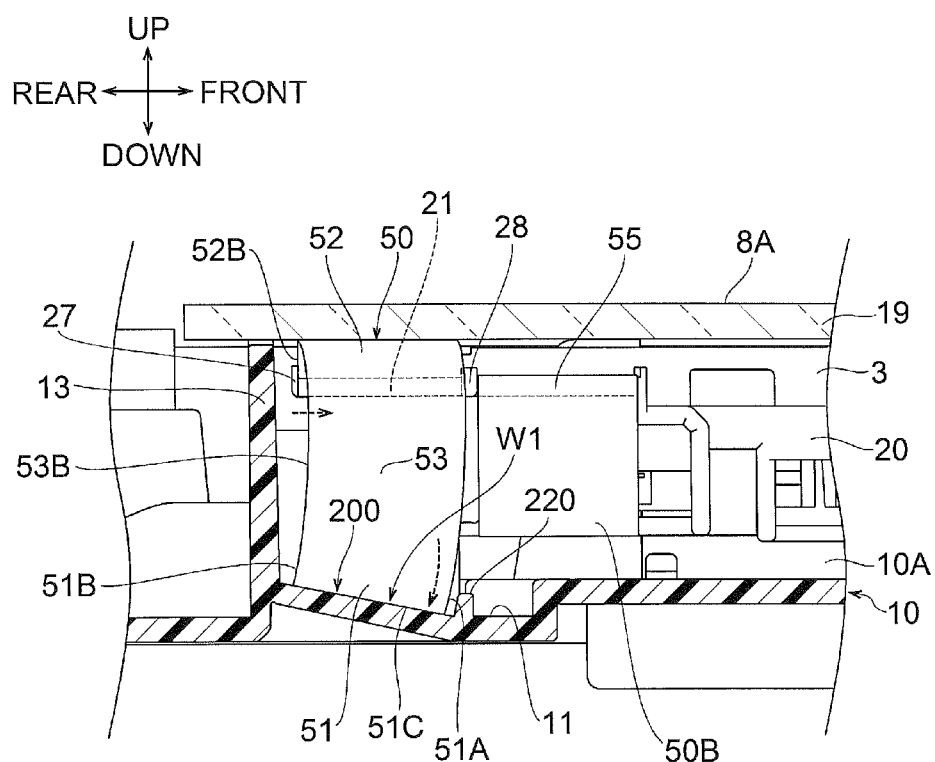
FIG. 13 is a partial sectional view of the image reading apparatus, similar to FIG. 11, according to the third example embodiment, depicting an effect of the second sloping surface on the wiring cable.

As depicted in FIGS. 11-13, an image reading apparatus 1 according to a third embodiment may comprise a second inclination surface 200, instead of the first inclination surface 100. Other structures in the third embodiment may be similar to those of the first embodiment. Therefore, like reference numerals may be used for like corresponding parts in FIGS. 11-13 and a detailed description of similar parts with respect to the third embodiment might not be repeated.

The image reading apparatus 1 according to the third embodiment may comprise a contact reduction portion, e.g., the second inclination surface 200, disposed at the bottom wall surface 11. The second inclination surface 200 may be configured to reduce or prevent the contact of the second extending portion 52 and the curve portion 53 of the wiring cable 50 to the side wall 13.

The second inclination surface 200 may be provided at a portion of the bottom wall surface 11 where the second inclination surface 200 may be able to contact a facing surface 51C of the first extending portion 51 that may face the bottom wall surface 11. The second inclination surface 200 may incline upward toward the rear side and be connected to the side wall 13. As depicted in FIG. 11, a perpendicular vector S1 extending toward the platen glass 19 from the second inclination surface 200 may be inclined toward the front side away from the side wall 13.

An inclination angle α2 of the second inclination surface 200 with respect to the bottom wall surface 11 may be preferably approximately between 10 degrees and 45 degrees. In the example embodiment of FIG. 11, the inclination angle α2 may be approximately 20 degrees.

The second inclination surface 200 may be a flat surface extending along the entire length of the range E1 in which the curve portion 53 may move in the left-right direction.

FIG. 12 may depict a state in which the first extending portion 51, the curve portion 53 and the second extending portion 52 may be shifted toward the rear side. FIG. 13 may depict a state in which the first extending portion 51, the curve portion 53 and the second extending portion 52 might not be shifted in the front-rear direction.

A stopper 220 may be disposed on the bottom wall surface 11 in front of the second inclination surface 200. In other words, the stopper 220 may be disposed opposite to the side wall 13 in the front-rear direction with the second inclination surface 200 sandwiched therebetween. The stopper 220 may be a rib extending upward by a short length toward the platen glass 19. The stopper 220 may extend along the second inclination surface 200 in the left-right direction. With such a structure, the stopper 220 may be configured to contact a side of the first extending portion 51 opposite to the side wall 13 in the front-rear direction, e.g., a front edge 51A and guide (or regulate movement) of the wiring cable 50.

In the image reading apparatus 1 according to the third embodiment, when the first extending portion 51, the curve portion 53 and the second extending portion 52 are shifted toward the rear side, as depicted in FIG. 12, while the curve portion 53 is moving in the left-right direction in association with the reciprocating movement of the carriage 20, the rear edge 51B of the first extending portion 51 extending along the side wall 13 may contact the contact reduction portion, e.g., the second inclination surface 200, provided on the bottom wall surface 11. The curve portion 53 may try to move upward. However, the movement of the curve portion 53 may be regulated by the platen glass 19. The first extending portion 51 may be urged toward the bottom wall surface 11 due to the restoring force of the curve portion 53. Accordingly, as depicted in FIG. 13, the facing surface 51 C of the first extending portion 51 that may face the bottom wall surface 11 may contact the second inclination surface 200. The first extending portion 51 may incline along the second inclination surface 200. The perpendicular vector S1 extending from the second inclination surface 200 toward the platen glass 19 may be inclined away from the side wall 13. Therefore, in association with the inclination of the first extending portion 51 due to contact of the first extending portion 51 to the second inclination surface 200, the rear edge 52B of the second extending portion 52 may move away from the side wall 13. In the image reading apparatus 1, with the second inclination surface 200, contact of the rear edge 53B of the curve portion 53 and the rear edge 52B of the second extending portion 52 to the side wall 13 may be reliably reduced or prevented. Therefore, occurrence of dust due to wear of the side wall 13 may further be reduced and vibrations of the second extending portion 52 may further be reduced.

Therefore, in the image reading apparatus 1 according to the third embodiment, the reduction of the size of the image reading apparatus 1 may be realized and the reduction in an image reading quality may be controlled, similar to the image reading apparatus 1 according to the first and second embodiments.

In the image reading apparatus 1, the stopper 220 provided on the bottom wall surface 11 may contact the front edge 51A of the first extending portion 51. Therefore, excessive shift or movement of the first extending portion 51 toward the front side may be reduced or prevented. Accordingly, the curve portion 53 may smoothly move in the left-right direction.

(Fourth Embodiment)

Figure 14:
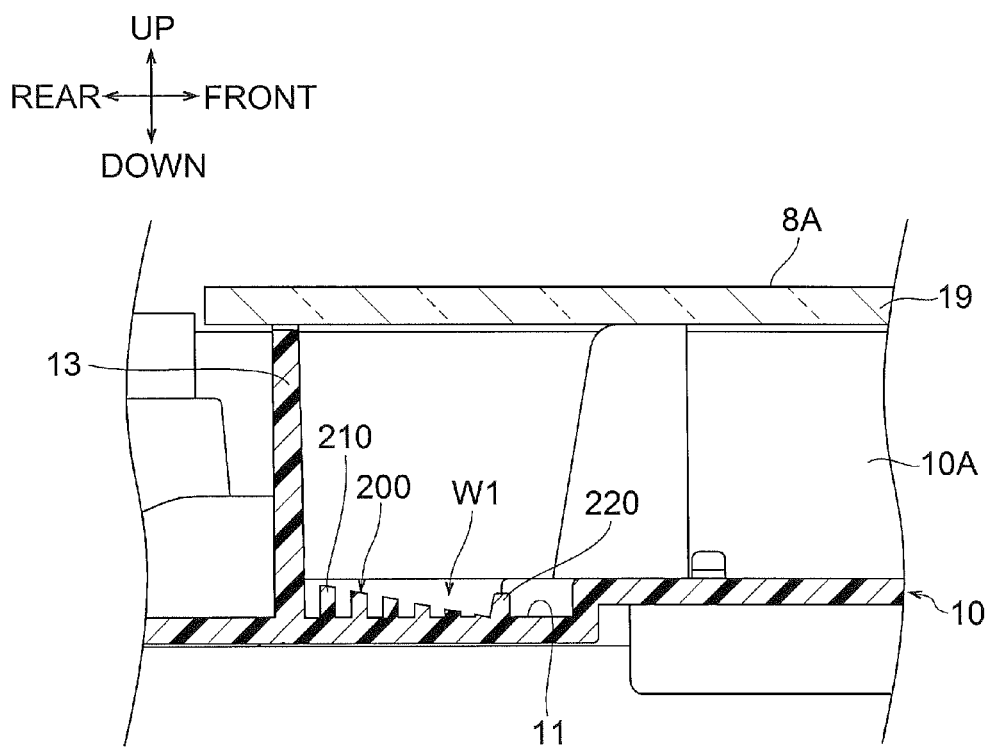
FIG. 14 is a partial sectional view of an image reading apparatus, similar to FIG. 11, according to a fourth example embodiment.

As depicted in FIG. 14, an image reading apparatus 1 according to a fourth embodiment may comprise ribs 210, instead of the second inclination surface 200 in the third embodiment. The ribs 210 may be provided at a portion of the bottom wall surface 11 where the ribs 210 may be able to contact the facing surface 51C of the first extending portion 51 that may face the bottom wall surface 11. The ribs 210 may extend in the left-right direction, with a distance therebetween in the front-rear direction. The height of the ribs 210 may gradually increase from the front-most rib 210 to the rear-most rib 210. Upper edges of the ribs 210 may define the second inclination surface 200. Other structures in the fourth embodiment may be similar to those of the first embodiment. Therefore, like reference numerals may be used for like corresponding parts in FIG. 14 and a detailed description of similar parts with respect to the fourth embodiment might not be repeated.

In the image reading apparatus 1 according to the fourth embodiment, the reduction of the size of the image reading apparatus 1 may be realized and the reduction in an image reading quality may be controlled, similar to the image reading apparatus 1 according to the first to third embodiments.

In the image reading apparatus 1, the second inclination surface 200 may be defined by the ribs 210. Therefore, a contact area between the first extending portion 51 and the second inclination surface 200 may be reduced, and the curve portion 53 may smoothly move in the scanning direction.

While the disclosure has been described in detail with reference to the specific embodiments, these are merely examples, and various changes, arrangements and modifications may be applied without departing from the spirit and scope of the disclosure.

For example, in the fourth embodiment, the ribs 210 may be arranged with a distance therebetween in the front-rear direction and each rib 210 may extend in the left-right direction. In another embodiment, for example, ribs may be arranged with a distance therebetween in the left-right direction and extend in the front-rear direction thereby defining the second inclination surface 200.

The disclosure may be applied to a so-called multi-function device having, for example, a copying function and a facsimile transmission and reception function, in addition to the function of the image reading apparatus 1.

What is claimed is:

1. An image reading apparatus, comprising:
a base member comprising a base wall and a peripheral wall extending orthogonally away from the base wall to define an accommodation region;
a movable member configured to reciprocate between one end portion of the accommodation region and another end portion of the accommodation region;
a reading unit supported by the movable member, and facing a platen in the accommodation region, the reading unit configured to read an image on a medium placed on the platen while the movable member reciprocates;
a cable comprising:
a curve portion;
a first extending portion extending along the base wall from a portion of the cable contacting the base wall to the curve portion of the cable; and
a second extending portion continuing from the curve portion and extending to an end portion of the cable connected to the movable member; and
a contact reduction portion configured to reduce contact of the second extending portion of the cable with a side wall of the peripheral wall, wherein the contact reduction portion comprises a first inclination surface that extends from the side wall of the peripheral wall toward the base wall or extends from the base wall toward the side wall of the peripheral wall.

2. The image reading apparatus according to claim 1, wherein the first inclination surface is located between the base wall and the side wall, and inclines with respect to the base wall.

3. The image reading apparatus according to claim 2, wherein the first inclination surface comprises ribs disposed with a distance therebetween.

4. The image reading apparatus according to claim 2, wherein a distance between a boundary line, where the first inclination surface meets the base wall, and the side wall in a width direction is approximately equal to a distance between an edge of the second extending portion and the side wall in the width direction.

5. The image reading apparatus according to claim 1, wherein the peripheral wall protrudes orthogonally from the base wall to define the accommodation region, and the first inclination surface is located in a corner region defined by the base wall and the side wall, and inclines with respect to the base wall.

6. The image reading apparatus according to claim 5, wherein the first inclination surface is connected to the base wall and the side wall.

7. The image reading apparatus according to claim 1, wherein the first inclination surface connects the base wall and the side wall, and inclines with respect to the base wall.

8. The image reading apparatus according to claim 1, wherein the first inclination surface connects the base wall and the side wall and inclines with respect to the base wall, and is configured to contact a facing surface of the first extending portion that faces the base wall.

9. The image reading apparatus according to claim 8, wherein the first inclination surface comprises ribs disposed with a distance therebetween.

10. The image reading apparatus according to claim 9, wherein the ribs are separated in a scanning direction in which the movable member reciprocates, and extend in a width direction that corresponds to a width of the cable and is approximately perpendicular to the scanning direction.

11. The image reading apparatus according to claim 9, wherein the ribs are separated in a width direction and extend in a scanning direction that is approximately perpendicular to the width direction, and a height of the ribs decreases in the width direction.

12. The image reading apparatus according to claim 8, wherein the base wall comprises a stopper thereon,
wherein the stopper protrudes toward the platen from a portion of the base wall, and is configured to regulate movement of an edge of the first extending portion on a side of the cable opposite to the side wall.

13. The image reading apparatus according to claim 1, wherein the movable member comprises a regulating portion configured to regulate movement of an end portion of the second extending portion in a width direction toward the side wall.

14. The image reading apparatus according to claim 1, wherein the contact reduction portion extends along an entire length of a range in which the curve portion moves in a scanning direction, which is a direction that the movable member reciprocates.

15. The image reading apparatus according to claim 14, wherein the base member comprises a wiring area disposed between the side wall and a reading area in which the reading unit reads the image, and wherein the first extending portion, the curve portion and the second extending portion are disposed in the wiring area.

16. The image reading apparatus according to claim 15, wherein the cable comprises a folded portion comprising:
   a first portion extending into the reading area by folding an end portion of the second extending portion toward the reading area with respect to the side wall; and
   a second portion disposed closer to the side wall with respect to the first portion of the folded portion.

17. The image reading apparatus according to claim 16, wherein the movable member further comprises a spacer positioned between the first portion and the second portion.

18. The image reading apparatus according to claim 1, further comprising:
   a platen facing the base wall,
   wherein the platen is supported by the side wall.

19. The image reading apparatus according to claim 1, wherein a length of the first extending portion and a length of the second extending portion change as the movable member reciprocates,
   wherein changes in the length of the first extending portion and the length of the second extending portion complement each other.

20. The image reading apparatus according to claim 1, wherein the contact reduction portion is further configured to reduce contact of the curve portion of the cable with the side wall.

21. The image reading apparatus according to claim 1, wherein the side wall extends in a scanning direction in which the movable member reciprocates.

22. An apparatus, comprising:
   an image reading unit, comprising:
      a base member comprising a base wall and a peripheral wall extending orthogonally away from the base wall to define an accommodation region;
      a movable member configured to reciprocate between one end portion of the accommodation region and another end portion of the accommodation region;
      a reading unit supported by the movable member, and facing a platen in the accommodation region, the reading unit configured to read an image on a medium placed on the platen while the movable member reciprocates;
      a cable comprising:
         a curve portion;
         a first extending portion extending along the base wall from a portion of the cable contacting the base wall to the curve portion of the cable; and
         a second extending portion continuing from the curve portion and extending to an end portion of the cable connected to the movable member; and
      a contact reduction portion configured to reduce contact of the second extending portion of the cable with a side wall of the peripheral wall; and
   an image forming unit configured to form an image on a medium and disposed adjacent to the base wall of the image reading apparatus,
   wherein the first extending portion, the curve portion, and the second extending portion are disposed in a wiring area, and wherein the base wall comprises a recess in the wiring area.

23. The apparatus of claim 22, wherein the contact reduction portion extends from the side wall of the peripheral wall.

24. The apparatus of claim 22, wherein the contact reduction portion comprises a first inclination surface located between the base wall and the side wall, and inclines with respect to the base wall.

* * * * *